Figure 1:
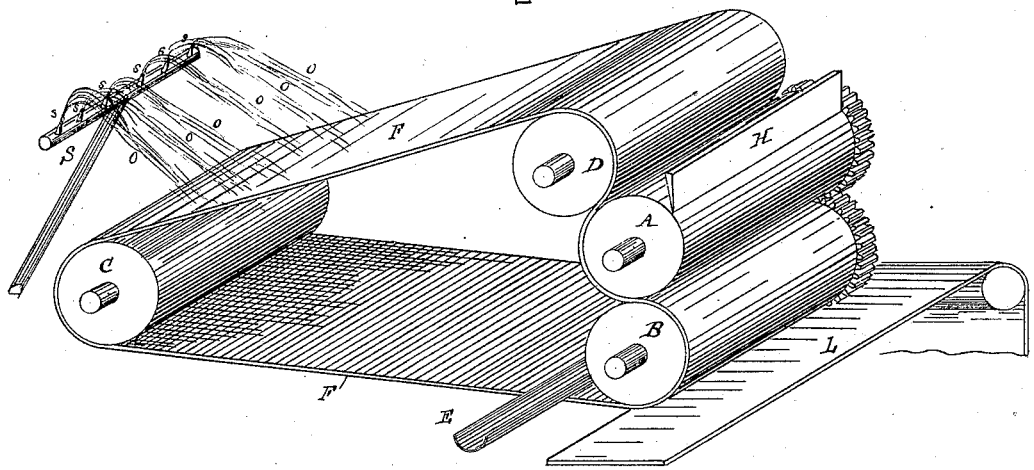

(No Model.)

R. H. SMITH.
PROCESS OF RECOVERING PARAFFINE, STEARINE, OR OTHER SOLID MATTERS FROM PETROLEUM AND OILS, AND IN APPARATUS THEREFOR.

No. 306,543.                    Patented Oct. 14, 1884.

WITNESSES:
W. G. Button
George A. Sonneborn

INVENTOR
Rollin H. Smith
BY
John R. Bennett
ATTORNEY

UNITED STATES PATENT OFFICE.

ROLLIN H. SMITH, OF CARBONDALE, PENNSYLVANIA.

PROCESS OF RECOVERING PARAFFINE, STEARINE, OR OTHER SOLID MATTERS FROM PETROLEUM AND OILS, AND APPARATUS THEREFOR.

SPECIFICATION forming part of Letters Patent No. 306,543, dated October 14, 1884.

Application filed January 14, 1884. (No model.)

*To all whom it may concern:*

Be it known that I, ROLLIN H. SMITH, a citizen of the United States, residing at Carbondale, in the county of Lackawanna and State of Pennsylvania, have invented a certain new and useful Improvement in the Process of Recovering Paraffine, Stearine, or other Solid Matters from Petroleum and Oils, and in Apparatus Therefor, of which the following is a specification.

My process consists in spraying oils containing paraffine, stearine, or other wax-like substance upon a traveling porous apron in a cold room, so as to chill and precipitate the solids upon the moving belt, then pressing the belt between press-rolls to remove the remaining liquid, and scraping off the solids and collecting the liquids separated from the solids, as hereinafter fully described and claimed.

My improved machine consists of an endless blanket or belt of textile material traveling over a series of rollers so arranged that the blanket passes over rollers at each end and between rollers which are closely pressed together. Over this endless belt is an arrangement for spraying the oil. This may consist of a pipe running at right angles with the belt and at some distance above it, say from ten to twenty feet. This pipe is provided with a number of petcocks with small apertures through which the oil is forced and falls in a spray upon the blanket or belt. Bearing upon the upper of the pressing-rollers is a scraper to remove the paraffine or stearine which adheres to the roller, and beneath or at one side of the lower pressing-roller is a small trough to collect the oil. Partially under both rollers is an endless belt traveling at right angles with the principal belt, and intended to catch the material removed by the scraper. The machine is placed in a room kept cool, and the oil is brought to the machine previously chilled or not, as may be found desirable. It is thrown upon the traveling blanket in a finely-divided spray or atomized condition, in which state it quickly assumes the temperature of the room. The oil is then carried by the belt between the pressing-rollers, where the wax, paraffine, stearine, or other solid material is separated from the oil, adheres to the upper roller, and is removed by a suitable scraper, and, falling upon a traveling belt, is carried out of the way. The oil penetrates the endless blanket, and, trickling down the lower pressing-roller, is collected in the trough placed underneath or at one side of the roller.

Figure 2:
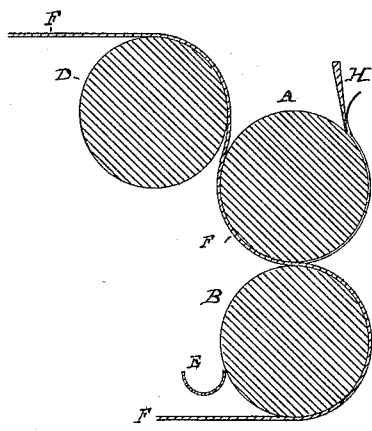

Figure 1 is a perspective view of the apparatus used in my process. All framing and other merely constructive features are omitted, and for the sake of greater clearness all the working parts are shown in their simplest form. Fig. 2 is a cross-section of the arrangement of rollers shown in Fig. 1.

A is the upper pressing-roller. B is the lower pressing-roller; C D, idle-rollers to stretch belt or blanket; E, oil-trough; F, blanket; H, scraper; L, endless belt to remove wax or other solid matter. Only one pulley is shown, and the lower half of belt is omitted. S is an oil-pipe; s, petcocks, and O sprays of oil.

The manner in which I carry out my invention is as follows: The machine described is placed in a room the temperature of which is kept at the degree at which it is desired to press the oil. This will vary with the oil operated upon. The oil to be pressed is chilled to the proper temperature, and this chilling is a very important part of the operation, as it is thrown in fine sprays upon the endless belt or blanket F as evenly as is practicable. The endless belt, being put in motion, travels in the direction indicated by the arrows, passing over the rollers C D, the roller D being placed slightly over and quite near to the roller A, but not so as to come into contact with it, the object being to keep the blanket closely pressed against a considerable portion of the circumference of the roller A, thus materially assisting in the separation, and between rollers A B, which latter rollers are pressed together more or less closely, according to the kind of oil to be pressed. The paraffine or stearine adheres to the roller A, and is scraped off by the chisel-shaped scraper H and falls upon the endless belt L, by which it is carried to any convenient place of deposit, either inside or outside the pressing-room. The oil, being separated from the solid material, passes through the belt, and, trickling down the roller B, is caught by the trough E and carried into a receptacle provided for it at the end of the roller B. (Not shown.)

The oil to be operated upon and containing the paraffine, stearine, &c., may be chilled to the desired temperature before being sprayed; or it may be sprayed at its natural temperature at a sufficient height, so that by its fall and travel it becomes sufficiently distributed to quickly assume the temperature of the surrounding atmosphere and reach the pressing-rollers at the proper temperature.

The endless belt or blanket may be composed of felt, cotton duck, muslin, hair-cloth, or any porous goods that will allow the oil separated from the paraffine, wax, or stearine free passage through it.

I find in practice a loose cotton cloth to work satisfactorily, and at less cost than any other suitable material.

For economy of construction, rollers B, C, and D may be made of wood. Roller A should be of iron, steel, brass, or other hard metal.

The apparatus for spraying may vary; but I have found a pipe fitted with a number of ordinary petcocks a convenient and practical device. The cocks point slightly upward. Any other suitable device for producing a spray may be used.

Having thus described my invention, what I claim, and desire to secure by Letters Patent, is—

1. The process herein described of separating paraffine, stearine, and other similar wax-like substances from petroleum and other oils, consisting in spraying the mixture of congealable and non-congealable materials upon a porous traveling sheet or belt, pressing out the liquid portion, and removing the solids from the press, substantially as set forth.

2. In the process of separating paraffine and other wax-like substances from oils, the combination of the following steps, viz: first, cooling the mixture; second, drawing off the liquids; third, pressing the solids while chilled; and, fourth, collecting the liquids and solids on opposite sides of the pressing apparatus, as described.

3. The apparatus herein described for separating paraffine and other solid wax-like substance from liquids, consisting of the combination of a spraying apparatus, a traveling apron or belt, and a pair of pressing-rolls, all as hereinbefore set forth.

4. In apparatus for separating paraffine and other wax from liquids, the combination of a spraying device, s, a belt, F, pressing-rolls A and B, and scraper H, as set forth.

5. The combination of the blanket or apron F, the pressing-rolls A B, the scraper H, and the trough E, as described.

6. The combination of the pressing-rolls A B, the scraper H, the trough E, and the endless carrying-belt L, all arranged to operate as described.

In witness whereof I have hereunto set my hand.

ROLLIN H. SMITH.

Witnesses:
H. W. HARRISON,
W. A. MANVILLE.